Patented Sept. 20, 1949

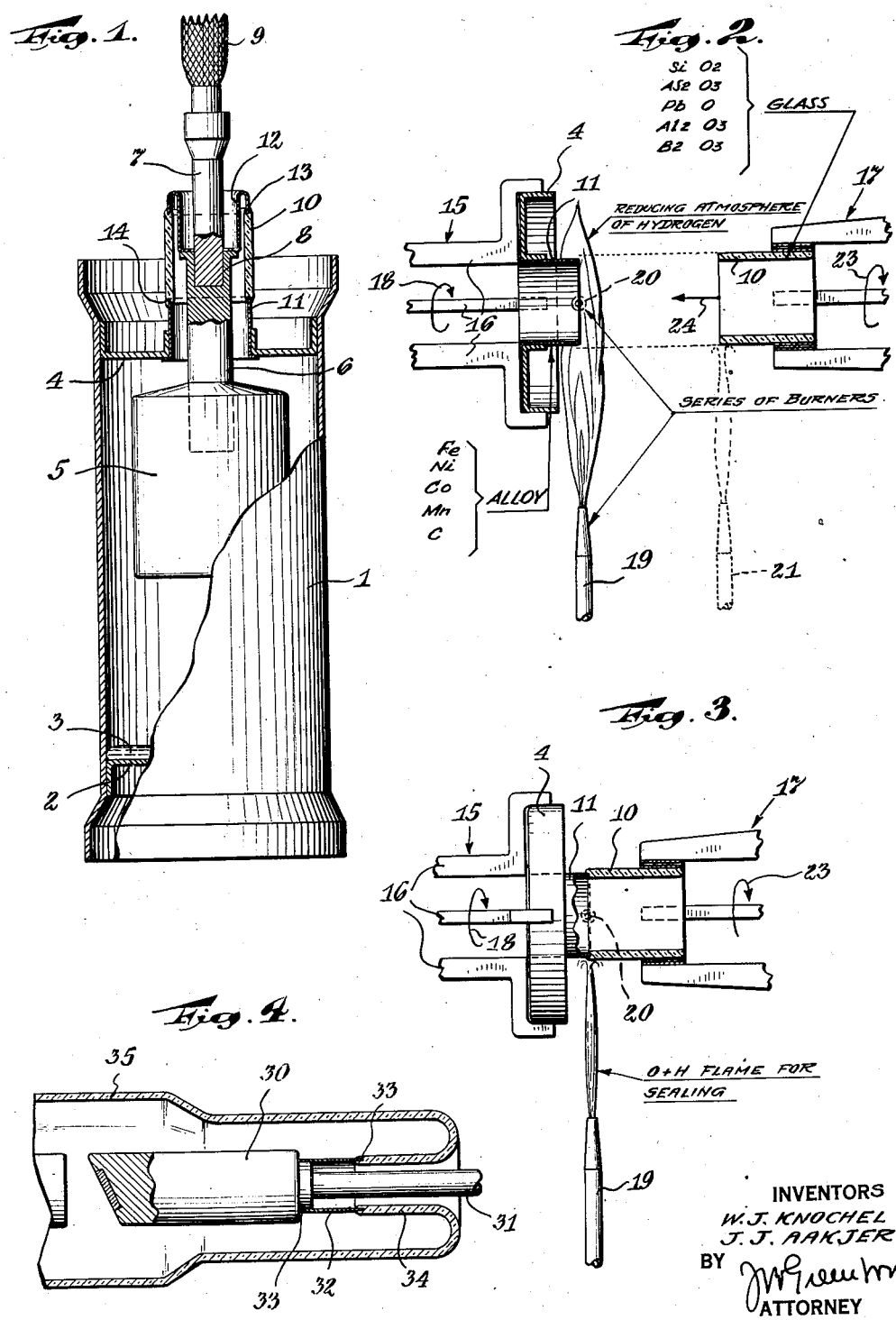

2,482,494

UNITED STATES PATENT OFFICE 2,482,494

METHOD OF MAKING GLASS-METAL SEALS

William J. Knochel and Jens J. Aakjer, East Orange, N. J., assignors to Westinghouse Electric Corporation, East Pittsburgh, Pa., a corporation of Pennsylvania Application March 23, 1943, Serial No. 480,166

2 Claims. (Cl. 49—81)

Our invention relates to a method of making glass-to-metal seals such as are used, for instance, in electronic devices, sealed resistors or other structures which contain a metal body connected with or sealed to a body of glass or the like vitreous material.

It is, as a rule, essential for a satisfactory permanent seal that the metal in immediate and sealing contact with the vitric material have a coefficient of thermal expansion similar to that of the latter material, and it has become customary to provide special nickel-steels or nickel-cobalt steels for this purpose. In particular, when using glass of the boron-silicate type for the envelopes of electronic discharge devices, a special steel alloy as described in Patent No. 2,062,335, issued December 1, 1936, to Howard Scott on a "Glass metal seal," contains 28% to 34% nickel, 5% to 25% cobalt, less than 1% manganese, and less than 0.1% carbon. A specific composition of this metal alloy, according to the patent, is formed of 29.8% Ni, 15.5% Co, 0.22% Mn and less than 0.1% C, and has virtually the same coefficient of expansion (between 3.0 and $5.5 \times 10^{-6}$ cm. per degree centigrade) as glass composed of 73.8% $SiO_2$, 0.5% $As_2O_3$, 5.2% PbO, 1% $Al_2O_3$, and 18.7% $B_2O_3$.

The alloy metal part to be sealed to the glass must be cleaned and baked before glassing it in order to obtain seals of satisfactory tightness and permanence. A treatment of this kind includes normally the steps of degreasing the metal, cleaning it with hydrochloric acid, and baking it at 1000 to 1100° C. for approximately a half hour in a hydrogen atmosphere. After the treatment, the alloy parts are welded, soldered or brazed to other metal parts of the assembly, then polished and made ready for the glassing operation. If possible, the degreasing and hydrogen baking steps are repeated before joining the alloy part to the glass body by fusion.

There are cases, however, where a relatively long time elapses between the degreasing and baking steps and the final glassing operation, or where these steps cannot be repeated after the alloy part has once been assembled with the other metallic elements of the appertaining structure. For instance, in various types of electrode assemblies, such as the anode assembly of certain X-ray tubes, a copper cable is joined with the alloy part by silver solder. Due to the presence and proximity of copper and silver, the high-temperature baking cannot be repeated without damage to the assembly. Under the just-mentioned conditions, the known sealing operation results often in unsatisfactory seals as to stability and vacuum-tightness of the glass-to-metal joint.

It is an object of our invention to provide a method of making glass-to-metal seals of the aforementioned kind, which insures a satisfactory seal regardless of the length of time that intervened between the cleaning and baking of the alloy steel and the final glassing operation.

Another object of the invention is to provide a glassing method for nickel steels of the type here referred to, which insures a satisfactory permanent seal in cases where a repetition of a cleaning and baking treatment is inappropriate or unfavorable once the steel body has been assembled with other elements.

Still another object of our invention, allied to the foregoing, is to provide simple and effective means for performing our glassing method in the course of normal manufacture and with the aid of normal factory equipment so as to avoid an appreciable addition to the time and cost of the glassing procedure as heretofore customary.

We have discovered that the above-mentioned objectives and advantages are achieved, if the nickel steel or alloy parts previously cleaned and then baked at a temperature of 1000 and more degrees centigrade, are made ready for glassing in the customary manner, but are then heated for a short time at red heat in a reducing atmosphere before the glassing proper is performed. The temperature of the heating, immediately preceding the final glassing step, is approximately 900° C., i. e., below the baking temperature and not injurious to any copper or silver elements attached to the steel part. The heating time is from about 3 to 10 minutes, for instance, approximately 5 minutes. According to another feature of the invention, the intermediate reducing heat treatment is performed with the aid of burners operating with a hydrogen-rich flame. It is also a feature of the invention to use for the reducing heating the same burners that serve subsequently for the glassing operation proper and to vary the proportional supply of oxygen and hydrogen to the burner in order to effect the change from a reducing to an oxidizing atmosphere.

The invention will be more clearly understood from the following description in conjunction with the drawing, in which:

Figure 1 represents a lateral part-sectional view of a discharge device containing a glass-metal seal made in accordance with the invention;

Fig. 2 illustrates the reducing heat treatment in accordance with the invention as applied to one of the glass-metal seals of the apparatus shown in Fig. 1;

Fig. 3 illustrates the next following method step, i. e. the final sealing operation, as applied to the same part of the apparatus of Fig. 1; and Fig. 4 shows a longitudinal section through the anode portion of an X-ray tube containing a glass-metal seal made and treated in accordance with the present invention.

Referring to Fig. 1, reference numeral 1 designates the vacuum vessel or envelope of a mercury arc discharge tube. The bottom of the vessel is closed by a disc-shaped bottom plate 2 covered by a pool 3 of mercury. The upper end of the cylindrical vessel 1 is closed by a header 4 which carries the anode structure of the discharge apparatus. The bottom plate 2 and the header 4 are tightly sealed to the cylindrical wall of the vessel 1.

The anode structure mounted on the header 4 includes the anode body proper marked by numeral 5. This body consists of carbon and is mounted on a stem 6 of copper or the like highly conductive material. A copper terminal 7 engages the stem 6 and is firmly soldered to the stem by means of a silver solder located at the junction 8. The terminal 7 is connected to a braided copper cable 9 serving to supply the anode connector.

A vacuum-tight junction between the anode assembly and the header 4 of the discharge vessel is formed of a cylindrical body 10 of glass or the like vitreous material and of two intermediate metal bodies 11 and 12, also of substantially cylindrical shape which consists of a metal, such as the above-mentioned alloy, whose thermal coefficient of expansion is similar to that of the glass body 10. The metal body 12 has one of its ends sealed vacuum-tight to the stem 6 by welding, brazing or soldering; the other end at 13 is sealed to the glass body 10 by fusion with the aid of the method according to the present invention. The lower edge of the metal body 11 is similarly welded or otherwise joined with the header 4, while the upper edge, at 14, forms a seal with the glass body 10. The latter seal is also produced by a method according to the invention.

When manufacturing and assembling the discharge device, and particularly the header 4 and the anode structure, the metal parts 11 and 12 are first subjected to the so-called carburization schedule consisting of a degreasing step, a following cleaning treatment under application of hydrochloric acid, and a next following baking treatment at a temperature of 1000 to 1100° C. for approximately a half hour in a hydrogen atmosphere. This treatment is set forth in the Howard Scott Patent 2,043,307 of June 9, 1936, and is in accordance with the customary procedure mentioned in the foregoing and is carried out before the parts 11 and 12 are joined with the other metal and glass bodies of the anode assembly described below.

After joining the metal body 11 to the header 4 by welding, soldering or brazing in the customary manner, the header 4 is placed in the head chuck 15 of a glassing lathe having jaws 16, as is illustrated in Fig. 2. The glass body 10 to be joined with the metal sleeve 11 is placed in the tail chuck 17 of the lathe. Both elements 10 and 11 are now in proper position for the glassing operation. However, before joining the two bodies and applying the heat necessary for the fusion, the chucks 15 and 17 are set in rotation, as indicated by the arrow 18, and the above-mentioned intermediate heat treatment is applied to the part of the sleeve 11 to be joined with the glass body 10. This treatment is performed by applying a hydrogen-rich flame to the body 11. To this end, a number of burners are arranged substantially in radial direction relative to the axis of rotation. One of these burners is indicated at 19. Another burner, extending perpendicularly to the plane of illustration, is indicated at 20. The flame is produced by feeding a mixture of oxygen and hydrogen to the burners. The relative amounts of oxygen and hydrogen are adjustable, for instance, by means of a regulating valve (not illustrated). When performing the reducing heat treatment just mentioned, the gas supply to the burners is so adjusted that the hydrogen predominates, so that the reducing atmosphere within the body of flames surrounding the sleeve 11 when performing the treatment is rich in hydrogen and has a reducing effect on the sleeve 11 and on any oxides formed on the metal surface to be joined with the glass body. This heating treatment is maintained at a temperature of 850 to 930° C. or approximately 900° C. for a period between 3 and 10 minutes. A treatment for about 5 minutes has proved to be sufficient for favorable results.

After the termination of the reducing heat treatment, the sleeve 11 is permitted to cool. Then the treated portion of the sleeve 11 is polished by applying aloxite cloth (320 grit). The part 11 is then wiped with a clean rag that has been dipped in alcohol. After that, the part 11 is ready for the final glassing operation. It is not always necessary to polish after the treatment.

The final operation requires heating both the edge portion of sleeve 11 and the glass body 10 up to the fusion temperature. For this purpose, the supply of gas to the series of burners, including the burners 19 and 20, is so adjusted that now the flame atmosphere is rich in oxygen and correspondingly low in hydrogen. This produces the required atmosphere as well as the necessary higher temperature. At the same time, another set of burners, represented by the burner 21, is used for heating the glass cylinder 10. The tail chuck 17 of the lathe is kept in rotation at the same speed and in the same direction (arrow 23) as the head chuck 15, so that no relative rotation exists between the heated bodies 11 and 10.

Finally, the head chuck and tail chuck are moved longitudinally together, as is indicated by the arrow 24 (Fig. 2), until the parts 10 and 11 reach the sealing position shown in Fig. 3. Only the set of burners, which includes burners 19 and 20, is continued in operation, and the joint between bodies 10 and 11 is heated thereby until the sealing operation is completed. Then the two bodies are permitted to cool. The result is a vacuum-tight assembly, as illustrated in Fig. 1.

The seal at 13 between the glass cylinder 10 and the metal sleeve 12 of the anode assembly shown in Fig. 1 is produced in the same manner and on the same or a similar lathe.

The X-ray tube illustrated in Fig. 4 contains an anode assembly of a type which involves considerable difficulty when made in accordance with the manufacturing methods heretofore available. The anode body 30 is mounted on a copper stem 31 which forms a lead for supplying the anode current. A sleeve 32 of nickel-cobalt steel alloy is soldered to the anode 30 at 33 by means of silver solder. The opposite edge 33 of the sleeve 32 is sealed to a reentrant neck 34 of the glass envelope 35 of the X-ray tube.

In constructions of the just-mentioned type, the presence of a silver solder in proximity to the edge to be glassed renders it infeasible to degrease and bake the anode structure once the sleeve 32 has been sealed to the anode body. As a result, the vacuum-tight metal-to-glass seal at 33 has often been the cause of defects. By applying the intermediate heat treatment at red heat, i. e. a relatively moderate temperature, in accordance with the present invention, the just-mentioned difficulties have been fully overcome.

We have found that the above-described treatment at moderate red heat in a reducing atmosphere is the most essential requirement of our method. It is often preferable to also apply the above-mentioned polishing treatment with or without a subsequent application of a rag soaked with alcoholic cleaning liquid. However, the hydrogen treatment at about 900° C. is as a rule sufficient to obtain the desired results.

The invention eliminates the difficulties and effects which had to be coped with in the past when single or assembled metal parts of alloy steels had to be stored for some time after the application of the hydrogen baking treatment and before applying the final glassing operation. By virtue of the present invention, the metal sleeves once treated can be used at any time without danger of faulty seals.

It will be obvious to those skilled in the art that the examples of glass-to-metal seals illustrated in the drawing and the auxiliary devices exemplified in the drawing for explaining the method according to the present invention can be modified in various respects, the essential features of our invention residing in the method as defined in the claims following hereafter.

We claim:

1. The method of making on a sealing lathe a seal between a glass body and a previously decarbonized metal structure formed of an iron base alloy with nickel and cobalt and having a coefficient of expansion similar to that of the glass body, which comprises the steps of placing the decarbonized metal structure on the sealing lathe in aligned proximity to the glass body ready for immediate interengagement for sealing said glass body to the metal structure, heating the decarbonized structure to a temperature of approximately 900° C. in a reducing atmosphere at the portion to be sealed by applying a hydrogen-rich flame for a period of about 3 to 10 minutes, cleaning the structure thus treated while leaving it in said position, and then immediately sealing the structure and the glass body together by applying an oxygen-rich flame.

2. The method of making a seal between a body of boro-silicate glass and a previously decarbonized metal structure formed of an iron base alloy with nickel and cobalt and having a coefficient of expansion similar to that of the glass body, which comprises the steps of heat treating the decarbonized metal structure at a temperature of approximately 900° C. for a period of approximately 5 minutes by applying a hydrogen-rich flame, permitting the structure to cool, polishing the structure with polishing cloth, cleaning the structure with the aid of cloth moistened with alcoholic liquid, and then immediately sealing the structure and the glass body together by applying an oxygen-rich flame.

WILLIAM J. KNOCHEL.
JENS J. AAKJER.

REFERENCES CITED

The following references are of record in the file of this patent:

UNITED STATES PATENTS

| Number | Name | Date |
|---|---|---|
| 1,740,443 | Donat | Dec. 24, 1929 |
| 1,884,665 | Greiner | Oct. 25, 1932 |
| 2,006,568 | Gustin et al. | July 2, 1935 |
| 2,043,307 | Scott | June 9, 1936 |
| 2,062,335 | Scott | Dec. 1, 1936 |
| 2,167,431 | Bowie | July 25, 1939 |
| 2,238,599 | Ramage | Apr. 15, 1941 |
| 2,279,168 | Kalischer et al. | Apr. 7, 1942 |